Aug. 28, 1956     O. S. RUDMAN     2,760,589
DRIVE MEANS AND WHEEL ADJUSTING MEANS FOR POWER MOWERS
Filed Sept. 2, 1953     2 Sheets-Sheet 1

*INVENTOR.*
O. SIGMUND RUDMAN
BY
*Terry and Cohn*
ATTORNEYS

INVENTOR.
O. SIGMUND RUDMAN
BY
*Terry and Cohn*
ATTORNEYS

United States Patent Office 2,760,589
Patented Aug. 28, 1956

2,760,589
DRIVE MEANS AND WHEEL ADJUSTING MEANS FOR POWER MOWERS

Oscar Sigmund Rudman, University City, Mo., assignor to Mid-West Mower Corporation, St. Louis, Mo., a corporation of Missouri Application September 2, 1953, Serial No. 378,127

6 Claims. (Cl. 180—19)

This invention relates to mowing machines, and has particular reference to improvements in power mowers of the rotary, horizontal blade type.

The principal object of the present invention is directed to the provision of an improved self-propelled mower of the character described.

Another object is achieved in the provision of improved means for adjusting the operating height of the carriage assembly, including engine, blade, and blade shroud or housing, for purposes of varying the effecting cutting height of the mower and also for adapting it for certain other uses, such as disintegrating leaves and the like, as for mulching purposes.

An important object is achieved in the provision of a self-propelled mower of the described character, wherein manufacturing economies are realized by a novel and improved driving arrangement which eliminates the need for differential or similar mechanism. This is accomplished in the machine of the present invention by employing a novel and economically constructed front wheel drive instead of the conventional rear wheel drive. In the prevailing arrangement the rear wheels propel the machine and these wheels are necessarily coupled through suitable mechanism, such as differential gears, that permit one wheel to rotate relative to the other to facilitate turning and steering of the machine. In the mower of the present invention the front wheels are engine driven and the rear wheels are freely rotatable relative to each other. The front driving wheels may be lifted out of the contact with the ground by moderate pressure exerted on a rearwardly extending manipulating member or handle. Such downward pressure rocks the machine about the axis of the rear wheels, and with the power driven front wheels thusly disengaged from the ground the operator may readily turn the machine, or manually move it back and forth in relative short strokes. The latter operation is desirable when cutting close to trees or shrubs.

The invention resides in the front wheel driving arrangement, and in the height adjustment constructional features which are especially suited to a mower having the driving provisions aforesaid, all as herein described and claimed. In the drawing:

Figure 1:
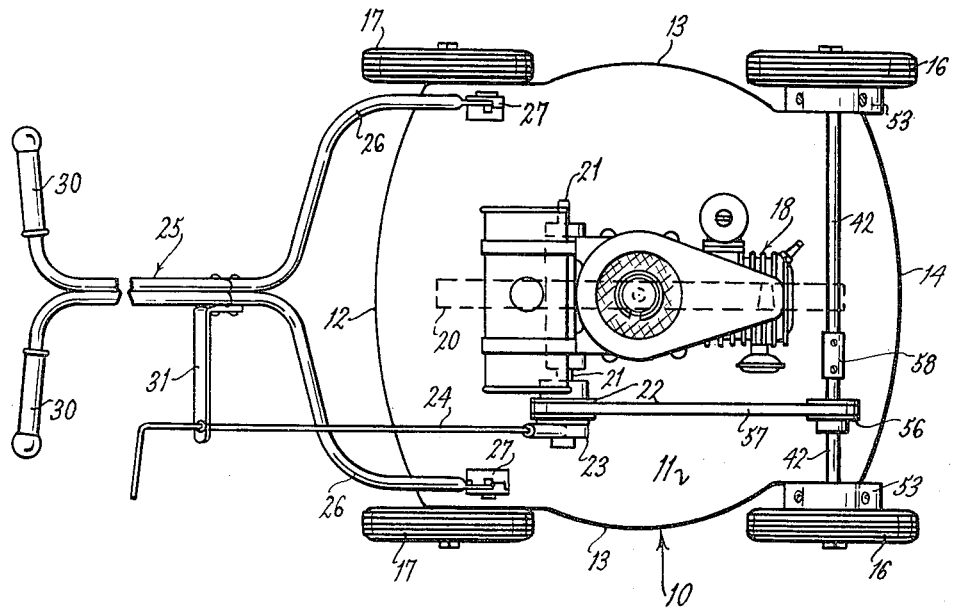
Fig. 1 is a top plan view of a mower constructed in accordance with and embodying the features of the present invention.

Referring now by characters of reference to the drawing, the frame or carriage body 10 of the machine has a top deck or platform 11 from the margins of which depend the rear wall portion 12, side wall portions 13, and a relatively shallow forward wall portion 14. The front of the carriage body below the front wall 14 is open except for spaced horizontal guard bars 15. The hollow under side of the carriage body accommodates the rotary cutter 20, and the side walls 13 are preferably curved to define a cutting space somewhat larger than, but conforming generally to, the shape of the path swept by the rotating cutter which operates therein.

The carriage body is mounted on paired front and rear wheels 16 and 17 respectively, arranged outboard of the side walls 13. The implement is powered preferably by means of a gasoline engine 18 having a vertically extending crank shaft, a lower continuation of which forms the vertical drive shaft 19. The engine is arranged on the top deck of the carriage body so that the drive shaft 19 projects downwardly, centrally therethrough. The blade 20 is secured by suitable means to shaft 19 near its lower end.

The engine 18 is also equipped with a horizontal power take-off shaft 21 and is arranged on the carriage body with the shaft 21 extending transversely thereof. A pulley 22 on the shaft 21 is adapted to be driven thereby through a suitable clutching device, indicated generally at 23. Operation of the clutching device 23 to engage and disengage the drive pulley 22 from the shaft 21 is effected through a clutch control rod 24 extending to the rear of the mower.

Figure 2:
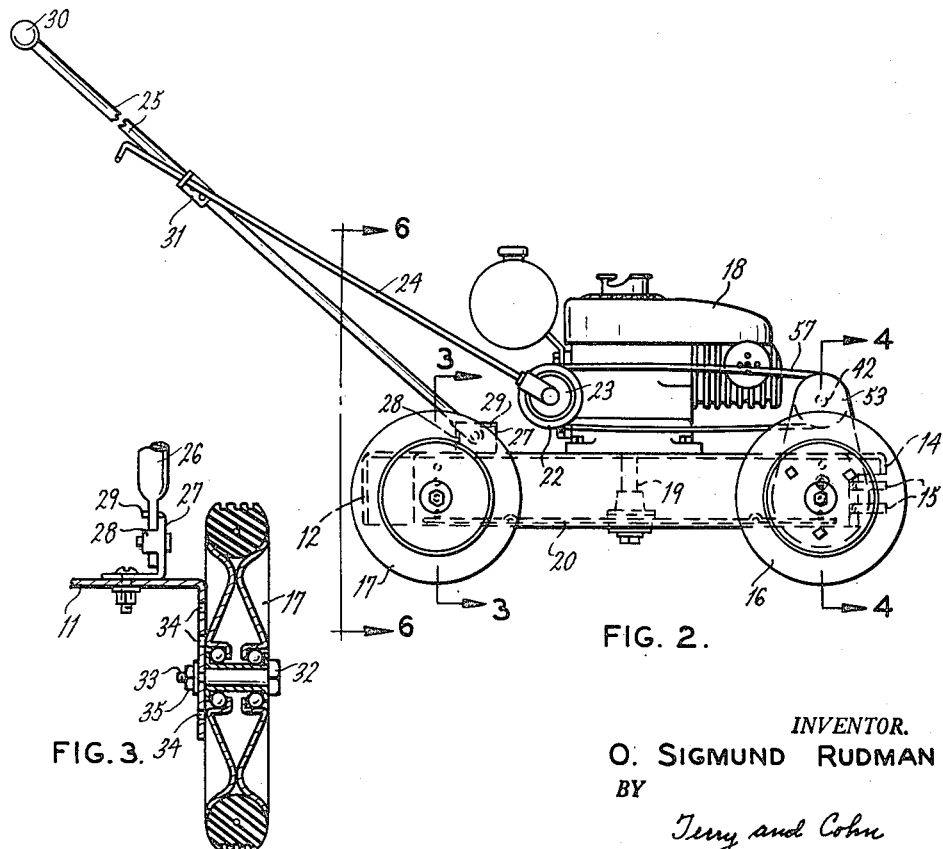
Fig. 2 is a side elevational view of the mower shown in Fig. 1.

The machine is adapted to be steered or maneuvered generally by a handle or manipulating member 25. This member extends rearwardly from the rear of the carriage body. Its forward end is divided and spread, the furcations 26 thusly formed being pivotally secured at their forward extremities to bracket fittings 27 fastened to the upper surface, near the rear side margins of the body platform. These bracket fittings are provided with spaced stop shoulders 28 and 29 that serve to limit the extent of pivotal movement of the handle 25. In its normal operating position handle 25 rests upon the stop shoulder 28 (Fig. 2), wherein downward pressure exerted on the handle tends to rock the entire mower assembly about the axis of the rear wheels 17, and to raise the front wheels 16 from the ground. At its rear extremity the handle 25 is divided and the paired portions are turned outwardly and equipped with hand grip 30 in accordance with conventional practice. A bracket 31 extending laterally from handle 25 receives and supports the rear end of the clutch control rod 24.

Figure 3:
Fig. 3 is an enlarged fragmentary sectional view through a rear wheel assembly, taken at line 3—3 of Fig. 2.

The rear wheels 17 are freely rotatable on stub shafts 32 (Fig. 3), which shafts have threaded extensions 33 that pass through apertures 34 formed in the sides 13 of the carriage body. Nut and lock-washer assemblies 35 on the threaded portion 33 rigidly secure the stub shafts in place. As best appears in Figs. 2 and 3, a plurality of the apertures 34 are provided, these being arranged in vertical spaced relation. The height of the carriage and hence of the cutting blade 20 may be regulated by installing the shaft extensions 33 in the appropriate apertures 34, and by making similar vertical adjustment of the front end of the carriage with respect to the front wheels 16, provisions for which will be hereinafter described.

A front wheel assembly is adjustable vertically, as a unit, with respect to the carriage body. The said assembly includes a pair of vertically extending bracket plates 40 provided near their upper ends 36 with openings 37 in which are fitted antifriction bearings 41 (Fig. 4) that receive the ends 38 of a horizontal, transversely disposed counter shaft 42 which is suitably spaced above the platform 11 of the body member. Each bracket plate 40 is provided at its lower end portion with a vertical series of spaced apertures 43. The spacing of these apertures corresponds to the spacings of the body apertures 34 for the rear wheel mountings, and also corresponds to the spacings of a series of apertures 44 formed in the side walls 13 of the carriage body. The bracket plates 40 are secured to the carriage body by means of machine screws 45 which extend from the inner side of the carriage body and engage internal threads formed in the plate apertures 43. The brackets are additionally secured by the threaded inner end portions 46 of stub axles 47, the threaded portions fitting in appropriate threaded apertures 43 in the brackets 40, projecting through apertures 44 in the carriage side wall 13 and receiving nut and lock washer assemblies 48 on their inner extremities. Also journalled for rotation on the front wheel axles 47, between each wheel 16 and its associated plate 40 are sprockets 49. Such sprockets are coupled to their adjacent front wheels by coupling bolt and collar assemblies indicated generally at 50. Transmission chains 51 (Fig. 5) connect the sprockets 49 in driven relation to sprockets 52 which are keyed or otherwise suitably fixed to the ends of the transverse drive shaft 42.

Figure 4:
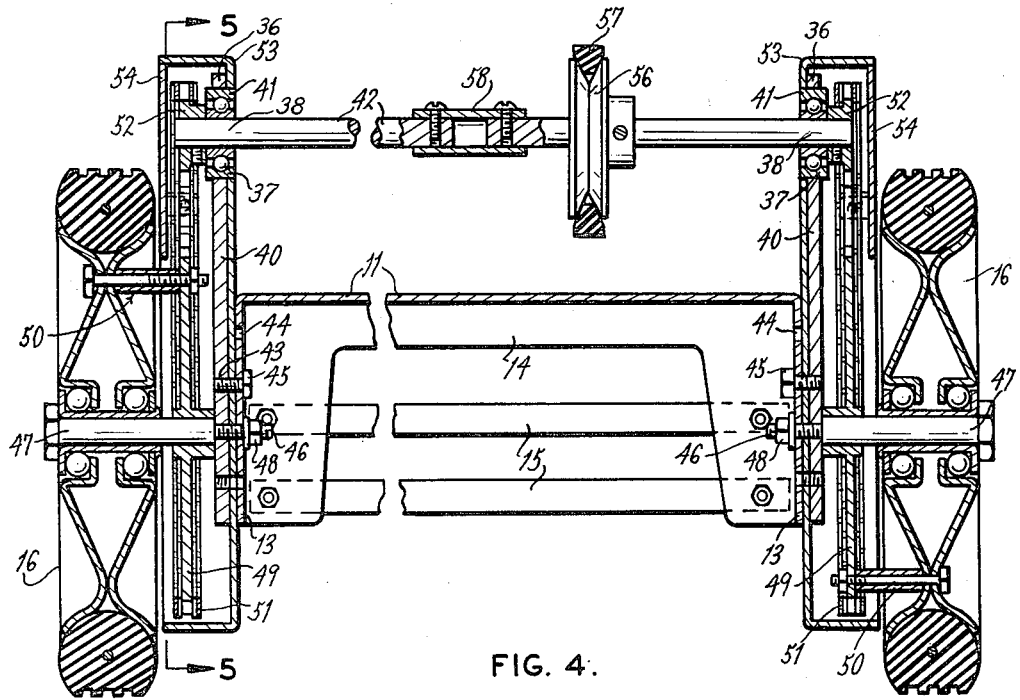
Fig. 4 is an enlarged transverse sectional view through the front wheel assembly taken at line 4—4 of Fig. 2.
Figure 5:
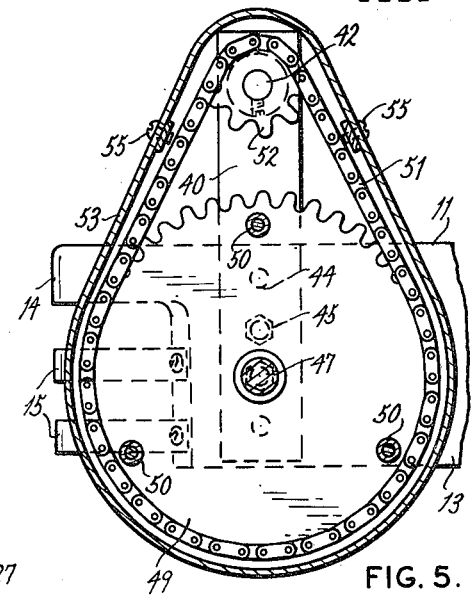
Fig. 5 is a sectional view taken at line 5—5 of Fig. 4.
Figure 6:
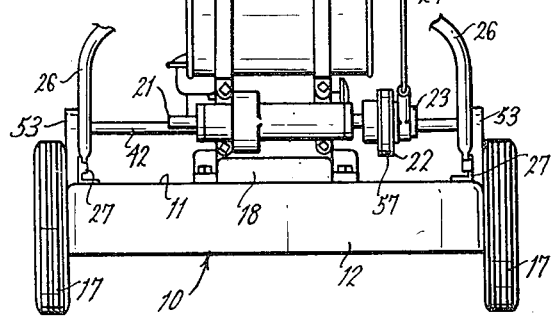
Fig. 6 is a rear elevational view of the carriage and engine assembly.

The chain and pinion assemblies are housed in suitable protective casings consisting of shells 53 and removable cover plates therefor 54, the latter being attached to the shells 53 by means of lugs and screw connections indicated generally at 55 (Figs. 4 and 5). The vertical side walls of the housing shells 53 which are provided with a series of apertures to register with the apertures 44 and 43 are clamped between the bracket plate 40 and the side walls 13 of the carriage body.

A drive pulley 56 is fixedly mounted on drive shaft 42 in alignment with the pulley 22 on the horizontal engine shaft 21, the pulleys 22 and 56 being operatively connected together preferably by an endless V-belt 57. In order to permit removal and replacement of the belt 57 without requiring dismantling of the front wheel assembly shaft 42 is made in two parts as shown, the several sections being connected together by a collar and bolt assembly indicated at 58 (Fig. 4).

From the foregoing description it will be understood that the adjustable front wheel assembly consists of the front wheels, the front wheel shaft, the bracket plates, housing shells, cover plates, shaft and pulley. All these parts which make up the front wheel assembly are adapted to be adjusted and secured in adjusted position, as a unit, onto the frame or body member 10.

It will be observed that height adjustment of the blade to vary the effective cutting height of the mower is effected by raising or lowering the frame or body 10 with the blade. Consequently there will be no substantial variation in the position of the blade within and with respect to the protective housing in which the blade is enclosed. Moreover, vertical adjustment of the front wheel assembly, within the limits provided for, will not require complementary adjustments to alter the tension in the transmission belt.

Having described my invention what I claim and desire to secure by Letters Patent is:

1. A grass cutting machine comprising a carriage, a power device thereon, said carriage including a carriage body, rear wheels vertically adjustably mounted on said carriage body, a front wheel assembly including a pair of front wheels, a drive shaft, and power transmission means connecting said drive shaft to said front wheels, means connecting said front wheel assembly for vertical adjustment to the carriage body, the last said means including a bracket located on each side of said carriage body, said drive shaft and said front wheels being carried by said brackets, fastening means for connecting said brackets to said carriage body in different vertical positions, and substantially vertically disposed power transmission means connecting said power device to said drive shaft.

2. A grass cutting machine including a carriage body, a power device thereon, wheels supporting the rear of the carriage body, mounted for vertical adjustment thereon, a front wheel assembly mounted for vertical adjustment on said carriage body, said assembly including a pair of front wheels, a transverse drive shaft spaced from the axis of said wheels, spaced brackets carrying said front wheels and said drive shaft, means for connecting said brackets to said carriage body in different vertical positions, power transmission means coupling said drive shaft to the front wheels, and longitudinal, substantially vertically disposed power transmission means operatively connecting said drive shaft to the power device.

3. In a power mower, a carriage body, an engine thereon having a horizontal power take-off shaft, a pair of rear ground wheels, means mounting the rear end portion of the carriage for vertical adjustment on said rear ground wheels, a front wheel assembly and means mounting the front end portion of the carriage for vertical adjustment on said front wheel assembly, said assembly including a pair of front ground wheels, a pair of brackets, each of said brackets carrying a front wheel, a drive shaft extending horizontally in vertically spaced parallel relation to the axes of said front ground wheels, and flexible power transmission belts connecting the ends of said drive shaft to said front ground wheels, said drive shaft being rotatively mounted and carried on said brackets, and a flexible vertically disposed endless power transmission belt extending between and connecting said drive shaft to said horizontal power take-off shaft of said engine.

4. A power mower comprising a carriage body, an engine, rear wheels mounted for vertical adjustment on the carriage body, a front wheel assembly adapted for unitary vertical adjustment on the carriage body, said assembly comprising paired brackets disposed on opposite sides at the front of the carriage, a drive shaft carried by said brackets, a wheel stub shaft carried by and projecting laterally from each bracket, said brackets fixing the distance between said stub shafts and said drive shaft, a front ground wheel on each said stub shaft, flexible transmission belts connecting said drive shaft to said front ground wheels, elements adjustably securing said brackets to the carriage body at any of a plurality of different vertically spaced settings, and a vertically disposed endless transmission belt operatively connecting said engine to said drive shaft.

5. In a power mower of the character described, including a carriage body, an engine mounted thereon, a manipulating member extending rearwardly from the body, vertically adjustable rear wheels on the body, a front wheel assembly unitarily adjustable vertically on the body, said assembly including vertical brackets at the front on opposite sides of the carriage body, a drive shaft extending between said brackets and journalled therein, said carriage body and side brackets being provided with vertically spaced apertures, stub shafts having portions extending through registering pairs of apertures in said body and said brackets, and serving to fix said stub shafts and brackets to the body, front ground wheels on said stub shafts, substantially vertically disposed transmission means connecting said engine to said drive shaft and other transmission means connecting the ends of said drive shaft to said front ground wheels.

6. In a grass cutting machine including a carriage body, a power device thereon, a drive wheel assembly mounted for vertical adjustment on said carriage body, said assembly including a pair of drive wheels, a transverse drive shaft spaced from the axis of said wheels, spaced brackets carrying said drive wheels and said drive shaft, means for connecting said brackets to said carriage body in different vertical positions, power transmission means coupling said drive shaft to the drive wheels, and substantially vertically disposed power transmission means operatively connecting said drive shaft to the power device.

References Cited in the file of this patent

UNITED STATES PATENTS

| | | |
|---|---|---|
| 755,613 | Casaday | Mar. 29, 1904 |
| 1,090,646 | Perkins | Mar. 17, 1914 |
| 1,656,105 | Durkee | Jan. 10, 1928 |
| 2,329,372 | Hitch | Sept. 14, 1943 |
| 2,532,076 | Raney | Nov. 28, 1950 |
| 2,582,177 | Swisher et al. | Jan. 8, 1952 |
| 2,645,300 | Watts | July 14, 1953 |